United States Patent [19]
Ueda et al.

[11] Patent Number: 5,207,314
[45] Date of Patent: May 4, 1993

[54] DEVICE FOR HORIZONTALLY HOLDING LOADING BASES MOVING CIRCULATIVELY IN VERTICAL PLANE

[75] Inventors: Satoshi Ueda, Itami; Kiyoshi Fukuyama, Moriyama, both of Japan

[73] Assignee: Tsubakimoto Chain Co., Osaka, Japan

[21] Appl. No.: 944,180

[22] Filed: Sep. 11, 1992

[30] Foreign Application Priority Data

Oct. 18, 1991 [JP] Japan ............................. 3-092954[U]

[51] Int. Cl.⁵ .................................................. B65G 17/18
[52] U.S. Cl. ...................................... 198/800; 211/121
[58] Field of Search .................. 198/475.1, 800, 798; 414/248, 251; 211/121; 312/97, 134

[56] References Cited

U.S. PATENT DOCUMENTS

| | | | |
|---|---|---|---|
| 1,270,001 | 6/1918 | Boos et al. | 198/800 |
| 2,275,431 | 3/1942 | Hart et al. | 198/798 |
| 3,575,281 | 4/1971 | Sutton | 198/800 |
| 3,664,482 | 5/1972 | Kornylak | 198/800 |
| 4,067,437 | 1/1978 | Frantl et al. | 198/800 |
| 4,493,414 | 1/1985 | Nevo-Hacohen | 198/800 |

*Primary Examiner*—Joseph E. Valenza
*Attorney, Agent, or Firm*—John Lezdey

[57] ABSTRACT

There is provided a device for conveying articles put on a loading base while horizontally holding the loading bases which are moving circulatively in a vertical plane by a single endless chain.

1 Claim, 4 Drawing Sheets

DEVICE FOR HORIZONTALLY HOLDING LOADING BASES MOVING CIRCULATIVELY IN VERTICAL PLANE

FIELD OF THE INVENTION

The present invention relates to a device for conveying articles put on loading bases while horizontally holding the loading bases which are moving circulatively in a vertical plane. The device is suitable for use in the assortment and conveyance of articles in a physical distribution center, a distribution center warehouse, and the like.

BACKGROUND OF THE INVENTION

According to the prior art, means is provided for conveying articles circulatively in a horizontal position on both going and returning sides. Such a means is disclosed, for example, in the specification and FIG. 2 of Japanese Laid-open Patent Application No. 32415/1992. As shown in this reference, two endless chains moving circulatively in a vertical plane are disposed side by side while being out of phase with each other in a longitudinal direction. Loading bases are fixed to ends of support rods which are mounted to the endless chains rotatably with such phase difference.

In the above-mentioned art, it is difficult to maintain the synchronous operation of both endless chains at the same speed because both chains are different in point of elongation. Furthermore, rolling occurs due to loosening of the chains and hence it is not easy to allow the loading bases circulate in a horizontal position.

SUMMARY OF THE INVENTION

According to the present invention, the aforementioned problems in conveyors caused by the use of two endless chains in the prior art are overcome by using a single endless chain with loading bases mounted thereto. Each loading base is rotatable through a bearing so that a horizontal circulative movement of the loading bases can be made possible. Accordingly, each loading base is provided at one end of a guide rod which is supported by the one chain rotatably through a bearing, while at an opposite end of the guide rod is mounted an inside face of a guide plate. An outer roller mounting rod is provided which projects in a vertically downward position from the opposite end of the guide rod on an outside face of the guide plate, while an inner roller mounting rod shorter than the outer roller mounting rod is provided which projects from the opposite end of the guide rod, both in parallel with the guide rod. The outer and inner rollers are mounted on the front ends of the outer and inner roller mounting rods, respectively. The outer and inner annular guide rails along which the outer and inner rollers are guided while rolling, respectively, are disposed side by side in a vertical plane parallel to the endless chain with spaced distances of the outer and inner roller mounting rods from the opposite end of the guide rod as phase differences. A cut passageway which permits the outer roller mounting rod to pass therethrough is formed in reversing portions at both ends of the inner guide rail.

In operation, the outer and inner rollers are mounted to the guide plate while being restrained by the outer and inner annular guide rails which are disposed side by side in a vertical plane parallel to the endless chain. The horizontal and vertical spaced distances of the outer and inner rollers provide phase differences, so that the rotation of the guide plate around the axis of the guide rod is prevented by the outer and inner rollers, and the guide plate moves in parallel with the guide rails while the position thereof is retained in both going and returning paths. Consequently, the loading base fixed to the guide plate through the guide rod circulates while holding its horizontal position.

DESCRIPTION OF THE PREFERRED EMBODIMENTS

Figure 1:
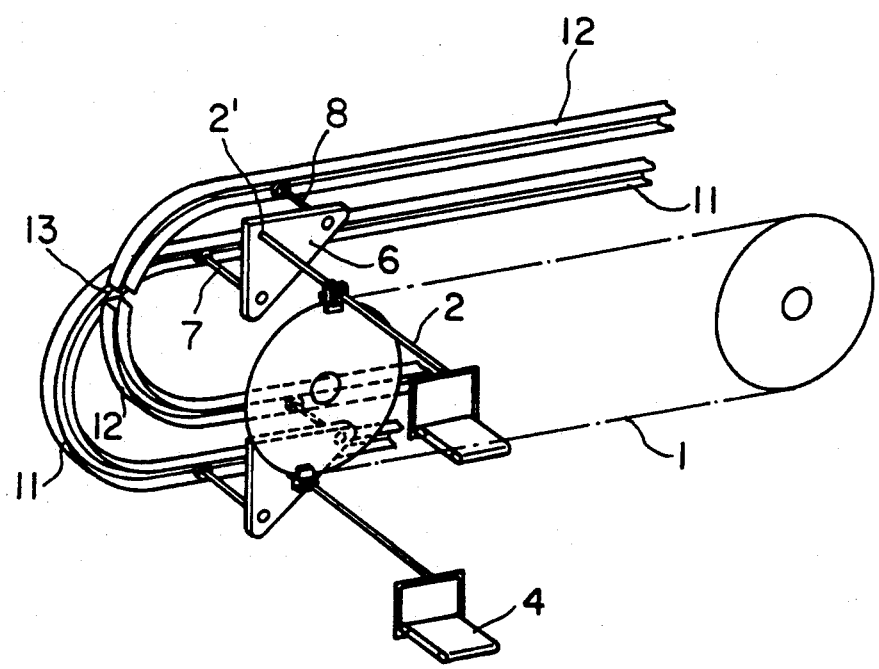
FIG. 1 is a perspective view of a reversing portion according to an embodiment of the present invention.
Figure 2:
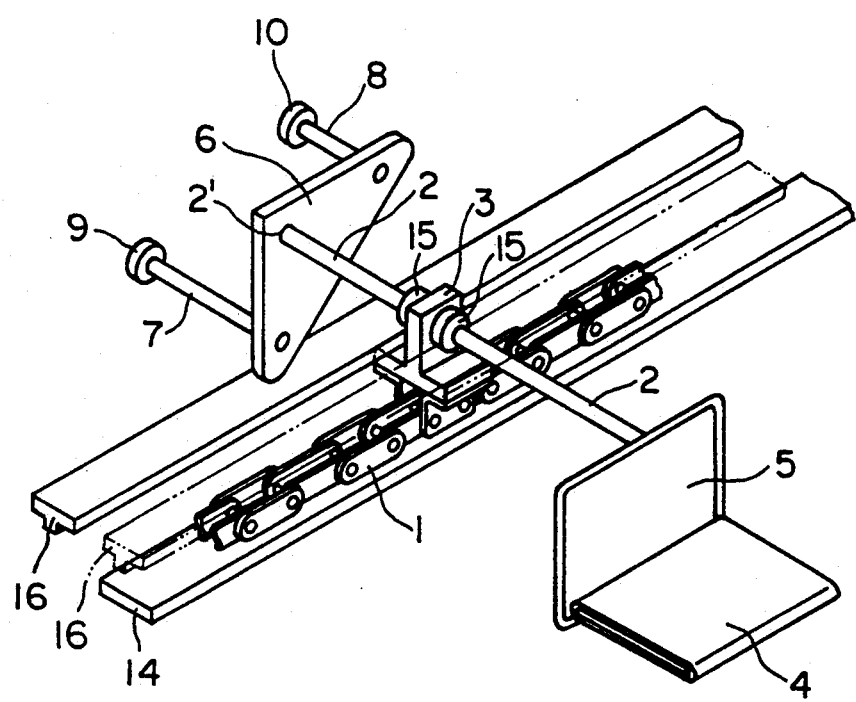
FIG. 2 is an enlarged perspective view of a guide rod mounting portion.

As shown in FIGS. 1 and 2, a single endless chain 1 is entrained about a pair of spaced driving sprocket and driven sprocket in a vertical plane, and plural guide rods 2 are supported by the endless chain 1 each rotatably through a bearing 3 which is mounted to the chain 1. To one end of each guide rod 2 is fixed a loading base 4 through a support plate 5, while to an opposite end of the guide rod 2 is fixed an inside face of a guide plate 6.

Figure 3:
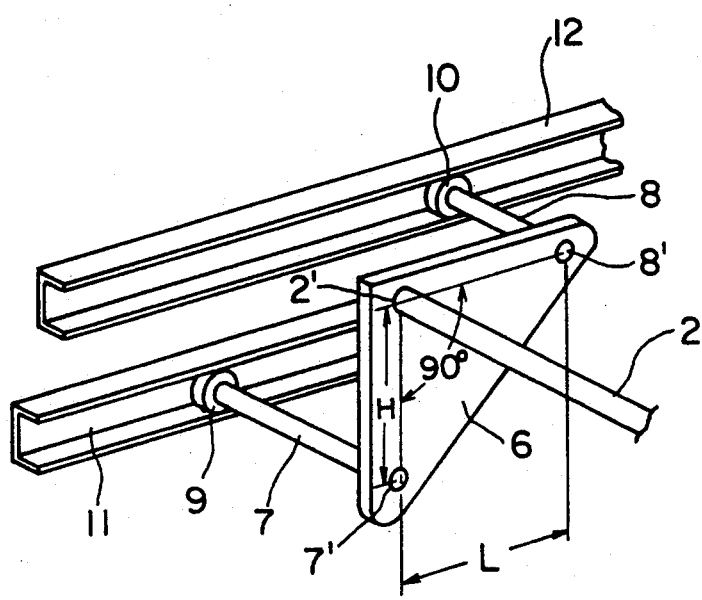
FIG. 3 is an enlarged perspective view of a guide rail portion shown in FIG. 1
Figure 4:
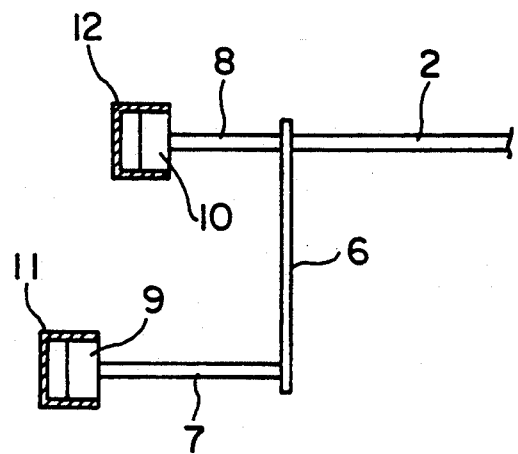
FIG. 4 is a sectional side view explanatory of the positional relationship of the guide rails.

An outer roller mounting rod 7 is provided which projects on an outside face of the guide plate 6 in a vertically downward spaced position 7' from the opposite end 2' of the guide rod, while an inner roller mounting rod 8 shorter than the outer roller mounting rod 7 is provided and projects on the guide plate outside face in horizontally spaced position 8' from the opposite end 2', both in parallel with the guide rod 2. An outer roller 9 and an inner roller 10 are mounted rollably on front ends of the outer and inner roller mounting rods 7, 8, respectively. As shown in FIGS. 1, 3 and 4, the outer and inner rollers 9, 10 are guided while their vertical floating are restricted by outer and inner annular guide rails 11, 12 which are disposed side by side in parallel with the endless chain 1 in a vertical plane.

An intersecting angle between lines 7' - 2' and 2' - 8' is 90°, and the outer and inner annular guide rails 11 and 12 are disposed in a vertical plane parallel to the chain 1 with a phase shift corresponding to a horizontal spaced distance L between the guide rod 2 and the inner roller mounting rod 8 in the longitudinal direction of the chain 1 and with a phase shift corresponding to a vertically downwardly spaced distance H of the outer roller mounting rod 7 from the guide rod 2.

A cut passage 13 which permits the outer roller mounting rod 7 to pass therethrough is formed in each of both end reversing portions of the annular inner guide rail 12.

As shown in FIG. 2, a rectilinear portion of the endless chain 1 is supported by a chain guide plate 14, and guide rollers 15, 15, which are mounted rotatably on the guide rod 2, are guided while rolling on a guide plate 16 to prevent downward deflection and twisting of the endless chain when an article is put on the loading base 4.

In the present invention, guide rods 2 with loading bases 4 fixed to one ends thereof are mounted to a single endless chain 1 rotatably, and the loading base 4 is driven circulatively by the one endless chain 1 alone. The outer roller 7 and inner roller 8 projecting from the guide plates 1, to which are mounted opposite ends of the guide rod 2, are merely supported for free rolling on associated guide rails. Therefore, even in the event of elongation of the endless chain 1, a horizontal circulative movement of the loading bases 4 is attained without any trouble. Besides, a cantilevered load on one end of each guide rod 2 induced by placing an article on the associated loading base 4 can undergo a reaction force developed at the other end of the guide 2 because the outer roller 7 and inner roller 8 are prevented from floating by the associated guide rails respectively. Consequently, the guide rod 2 is held in a horizontal position. Further, since the outer guide rail 11 and inner guide rail 12 are shifted by horizontal and vertical spaced distances between the outer roller 7 and the inner rollers 8 in the longitudinal direction of the chain 1 and in the vertical direction, respectively, each loading base 4 can circulate in a vertical plane while maintaining its horizontal position.

Figure 5:
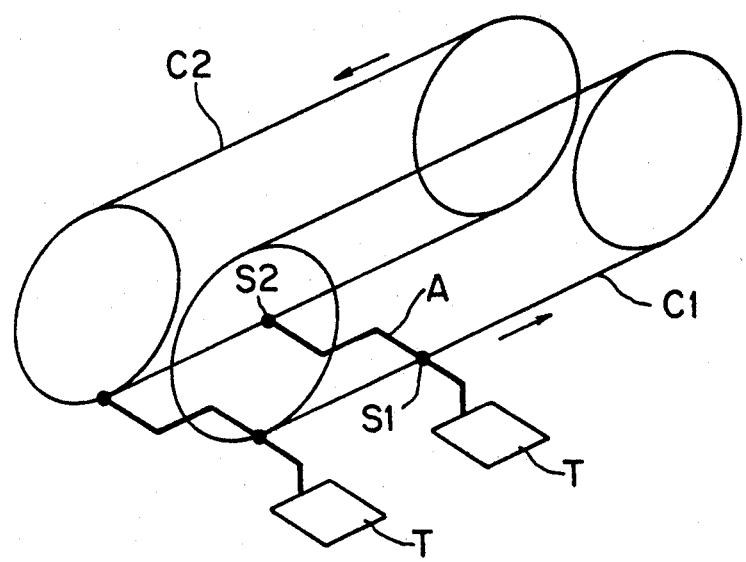
FIG. 5 is a perspective view of a prior art conveyor.
Figure 6:
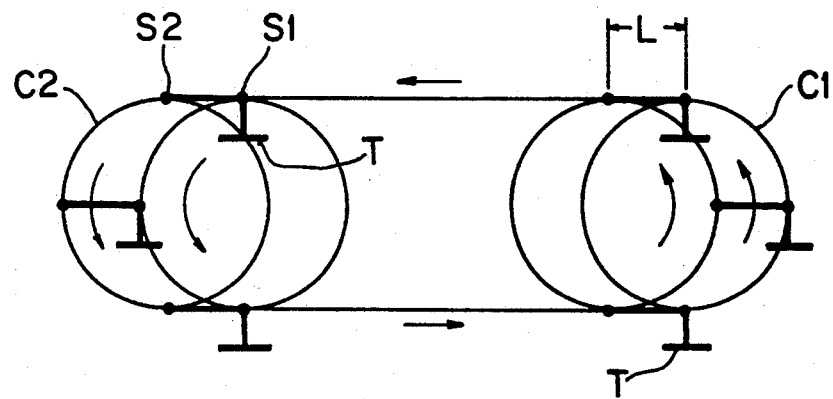
FIG. 6 is an explanatory front view of the device of FIG. 5.

The conventional device of the aforementioned Japanese Laid-Open application is basically illustrated in FIGS. 5 and 6. As shown in these figures two endless chains C1 and C2 moving circulatively in a vertical plane are disposed side by side with a phase difference L in the longitudinal direction of the chain. Guide rods A provided at front ends of chains C1, C2 and loading bases T are mounted to the endless chains C1 and C2 with the phase difference L rotatably through bearings at support points S1 and S2. The endless chains C1 and C2 are moved synchronously at the same speed, whereby the loading bases T are moved while being held in a horizontal position on both going and returning sides.

What is claimed is:
1. In a conveyor having loading bases for moving articles circulatively in a vertical plane while holding the articles in a horizontal position, the improvement comprising a single endless chain which is adapted to move circulatively in a vertical plane;
   a plurality of bearings mounted on said chain;
   a plurality of guide rods mounted to said chain, each guide rod being rotatable through a bearing about a horizontal axis orthogonal to said chain;
   a loading base fixed to one end of each of said guide rods and a guide plate having its inside face fixed to the opposite end of each guide rod;
   an outer roller mounting rod and an inner roller mounting rod having a shorter length than the length of the outer roller mounting rod projecting from an outer face of the guide plate in parallel with the guide rod in a vertically spaced position and in a horizontally spaced position, respectively, relative to the point of fixation of said guide rod to said guide plate:
   an annular outer guide rail along which an outer roller is rotatably mounted and an inner annular guide rail along which an inner roller is rotatably mounted disposed side by side in parallel with said chain in a vertical plane with a horizontal spaced distance between the opposite end of the guide rod and the inner roller mounting rod being a phase difference in a longitudinal direction, and a vertically downward spaced distance between the opposite end of the guide rod and the outer roller mounting rod being a phase difference in a vertical direction,
   said annular inner guide rail having a passageway in each of both end reversing positions to allow passage therethrough of the outer roller mounting rod, whereby each loading base circulates in a vertical plane while maintaining a horizontal position.

* * * * *